Dec. 14, 1926.
L. LANQUETIN
1,611,118
ELECTROMECHANICAL APPARATUS SERVING AS AN ELECTRIC GENERATOR
AND ENGINE STARTING DEVICE
Filed Sept. 11, 1923    3 Sheets-Sheet 1
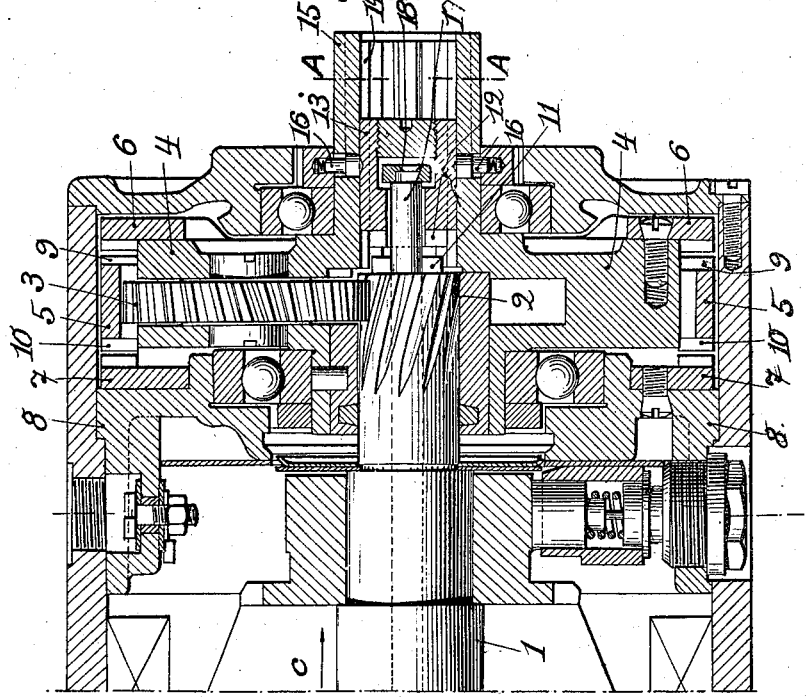
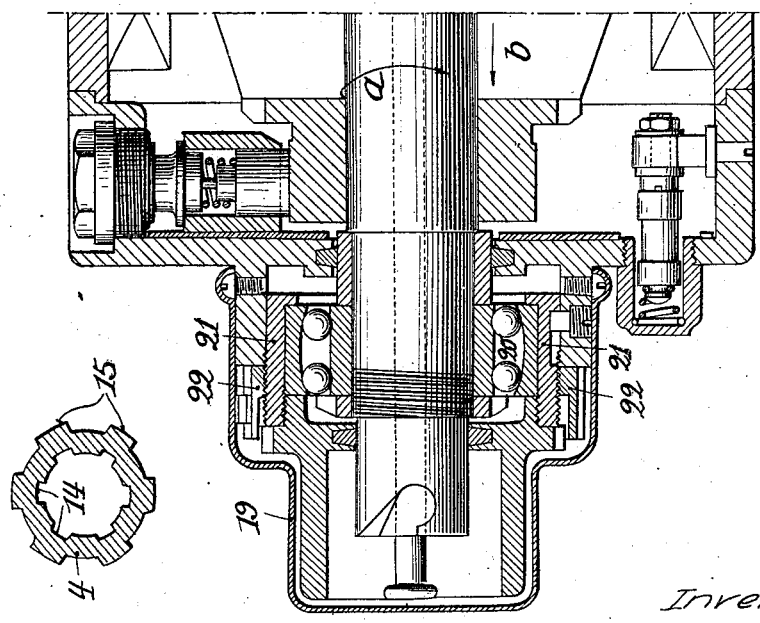
Inventor
L. Lanquetin

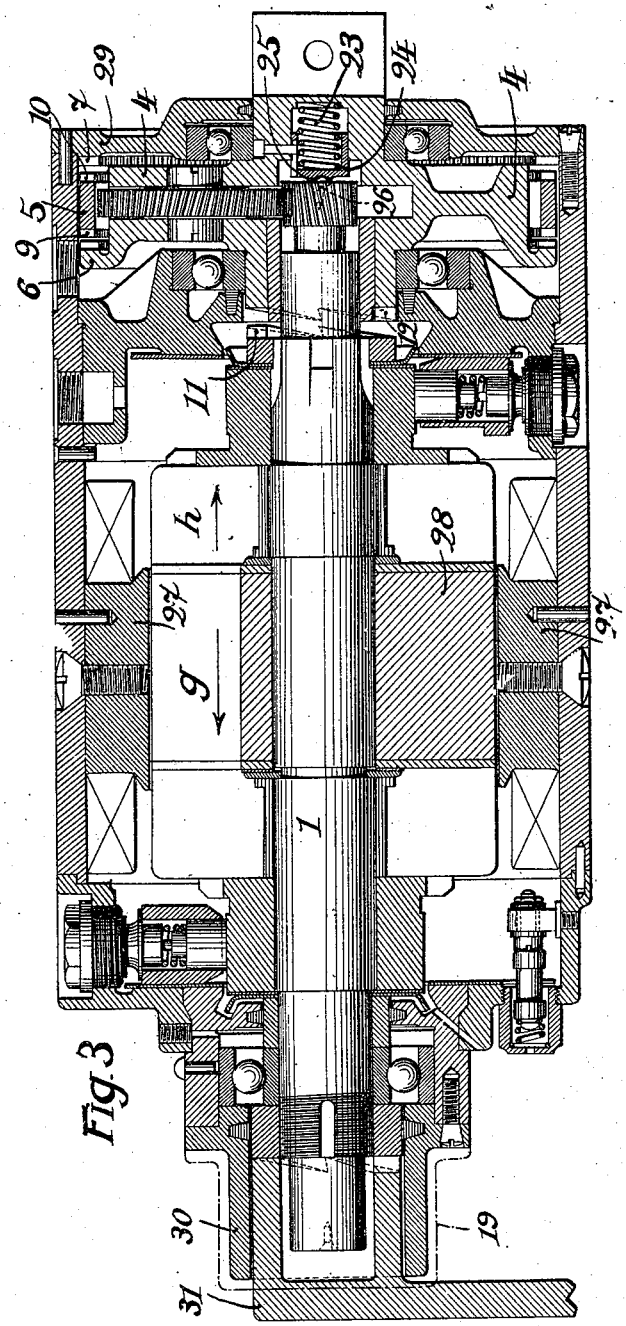

Dec. 14, 1926.                                                                1,611,118
                              L. LANQUETIN
        ELECTROMECHANICAL APPARATUS SERVING AS AN ELECTRIC GENERATOR
                       AND ENGINE STARTING DEVICE
                  Filed Sept. 11, 1923          3 Sheets-Sheet 3
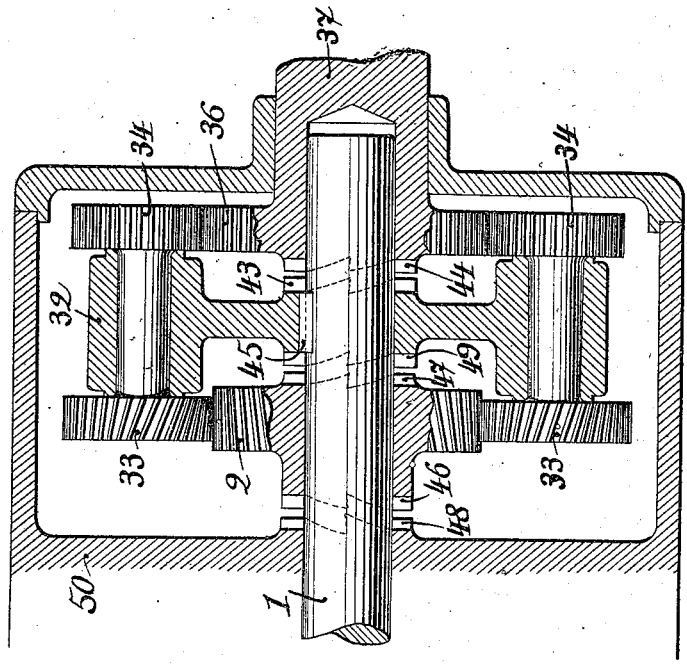
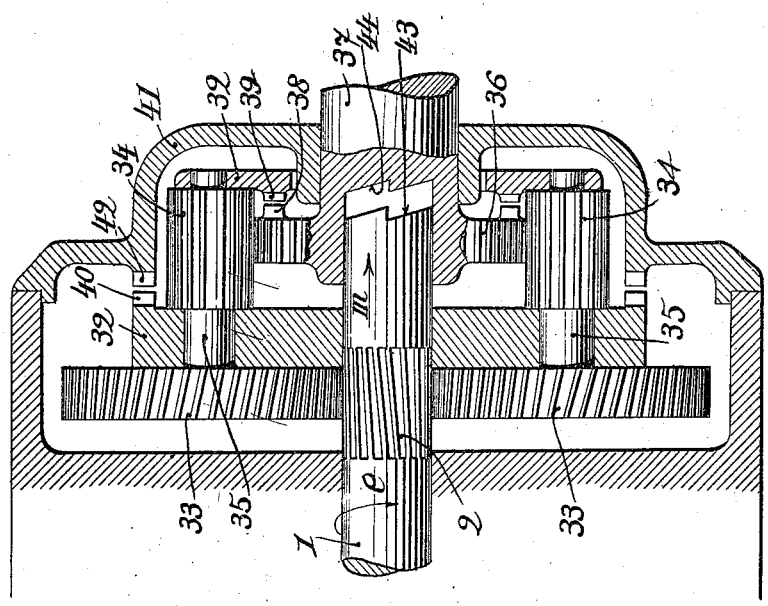
Inventor
L. Lanquetin Patented Dec. 14, 1926.

1,611,118

UNITED STATES PATENT OFFICE.

LÉON LANQUETIN, OF PARIS, FRANCE, ASSIGNOR TO THE SOCIETE "ETABLISSEMENTS DUCELLIER," OF PARIS, FRANCE.

ELECTROMECHANICAL APPARATUS SERVING AS AN ELECTRIC GENERATOR AND ENGINE-STARTING DEVICE.

Application filed September 11, 1923. Serial No. 662,133, and in France December 27, 1922.

The present invention relates to an electro-mechanical apparatus adapted for lighting and engine starting for motor vehicles, and it may be coupled directly to the engine crankshaft without the intermediary of a control.

When employed as an electric generator, the said apparatus rotates at engine speed, and when acting as a motor for engine starting purposes it furnishes but a small torque and operates at high speed, starting the engine through the medium of a change-speed box of the automatic type. In the said change-speed device which employs the differential system with a set of planetary gears, I make use of the reactions produced in different directions by worm gears in order to displace a suitable element which will insure according to its position either firstly the drive of the engine by said electric motor with speed reduction depending upon the ratio of the planetary gearing, or secondly the drive of the dynamo by the engine, the former now acting as a generator and operating upon direct drive.

The said change-speed box essentially comprises three elements i. e. a planetary gear set and two gear wheels engaging the planetary gears, two of the said elements being keyed respectively to the dynamo shaft and the engine shaft, the third consisting of the above-mentioned movable element.

Inasmuch as the operating principle will remain exactly the same in all cases, we may without departing from the spirit of the invention provide various forms of construction of said change-speed box, for example according as the movable element for changing the speed consists of the planetary gear set or of one of the said gear wheels. By way of example we will refer to the three cases in which the planetary gear set is (a) secured to the engine shaft, (b) secured to the dynamo shaft, (c) movable upon the latter shaft.

When the planetary gear set is secured to the engine shaft, the movable element consists of an internally toothed ring cooperating with the planetary gears; in order to reduce machine work and hence the cost, we may utilize the external portion of the planetary gear set as a roller path for the said toothed ring which now becomes centered upon the latter by means of the top part of the teeth.

In the case of an accident to the electrical part of the engine starter, a device is used whereby the engine can be started by handcrank in the usual manner, the dynamo shaft being now coupled to the engine shaft. The coupling is effected either by the use of suitable sleeves controlled through the dynamo shaft which is apertured for this purpose, or by imparting a lengthwise movement to the dynamo shaft together with the armature so that suitable clutching teeth on the end of the shaft shall engage like teeth on the end of the engine shaft.

The appended drawings which are given by way of example show various embodiments of my invention.

Fig. 1 is a longitudinal section of the apparatus.

Fig. 2 is a transverse section on the line A—A of Fig. 1.

Fig. 3 is a longitudinal section of a modification of the apparatus.

Figs. 4 and 5 are longitudinal sections of modifications of the change-speed box.

When the apparatus operates as an engine starter, the dynamo part will operate on the one hand with a separate excitation due to the series winding of the starter, and on the other hand it operates as a shunt-wound machine; the output is very high, so that much power is absorbed and the torque becomes quite small. We make use of any suitable device controlled by a switch in order to break the circuit of the armature and the fields in shunt on the dynamo side, and can thus obtain the maximum torque from the machine. A circuit opening and closing device of known type is mounted between the dynamo and the storage battery. Such details of electric outfit are in current use are hence not shown.

The dynamo shaft, Fig. 1, is formed at its end situated within the change-speed box as a worm gear 2, this portion engaging the planetary gears 3, only one of which is shown; said gears are mounted on a planetary gear holding disk 4 keyed to the engine crankshaft, and they are engaged with an outer toothed ring 5 which is centered upon the peripherical cylindrical surface of the disk 4 and is in direct contact with the said disk upon the whole width of the teeth. Upon the disk 4 is mounted a ring provided with ratchet teeth 6; a like ring 7 is secured to the dynamo bearing 8, and the ring 5 is provided upon both sides with the ratchet teeth 9, 10 cooperating respectively with the rings 6, 7.

Supposing that the various elements of the change-speed box are in the position shown in Fig. 1, upon sending current into the starter, the shaft 1 and the pinion 2 will rotate according to the arrow $a$ and the planetary gears 3 and the ring 5 will be actuated, the former according to $a$ and the latter in the contrary direction. Due to this action of the worm gearing, the ring 5 will now leave its middle position and will be moved in the direction of the arrow $b$ until it becomes engaged with the ring 7 by means of its ratchet teeth 10 and is held fast upon said ring. The planetary gears now roll within the ring 5 and draw with them the planetary gear holding disk, together with the engine to be started, in the direction of the arrow $a$ and according to the gear ratio of the planetary set.

During the first few explosions of the engine, the ring will be urged in the direction of the arrow $a$ whilst the inclination of the ratchet teeth will tend to impel it in the direction of the arrow $c$. When the dynamo begins to supply current to the battery, the armature will slow up, and since the reactions between the worm gears have now changed in direction, the said ring continues to be urged by a force acting in the direction of the arrow $c$.

In this movement, the ratchets 9 engage the teeth of the ring 6 and hold the outer ring 5 upon the planetary gear disk 4. I thus provide a direct drive between the engine and the starter; since the planetary gears can no longer rotate upon their axes, the shaft 1 is now turned at the same speed as the disk 4.

Should the electrical part of the starter become damaged, means must be provided whereby the usual hand crank can be employed to start the engine, and for this purpose the shaft 1 of the starter is provided with clutching teeth 11 so that when the starter shaft is impelled towards the engine by the crank and according to the arrow $c$, said teeth will be caused to engage the like teeth 12 on the sleeve 13 which by means of flutings is connected with the disk 4. At its end connected with the engine, said disk has the shape which is represented in Fig. 2. Internal flutings 14 connect the same with the sleeve 13, and external flutings 15 make connection with the engine shaft. The sleeve 13 is maintained in the longitudinal direction by the spring plugs 16 and it is apertured in order to receive the rod 17 which is provided with the head 18 and traverses the shaft 1 throughout its whole length in an axial bored-out portion of the same.

Instead of impelling the shaft 1 in the direction of the arrow $c$ in order to engage the teeth 11 and 12, a like result can be had by drawing upon the rod 17 in the direction of the arrow $b$.

Since the starter shaft is mounted without longitudinal play, it is displaced in the following manner. One removes a dismountable cover 19 with bayonet joint, which serves upon the side next the hand crank to protect the ball bearing 20 against water or grit. The said bearing comprises an outer movable cage 21 which can be set in position by the nut 22. In the case of Fig. 1, said nut is screwed to the cage and comes into contact with the starter casing, so that the teeth 11 are kept separate from the teeth 12.

Upon unscrewing the nut 22 to a certain extent, the cage 21 is now free to move through a like distance within the casing and in the direction of the arrow $b$, and this allows the displacement of the aggregate consisting of the shaft 1, its bearing, and its armature, in order to engage the sleeve 13.

The starter illustrated in Fig. 3 differs from the preceding by the means employed for the lengthwise movement of the shaft 1, by its disposition, by the position of the clutching teeth used for hand crank starting, and by the position of the ratchet rings.

The shaft 1 is maintained in the position shown in Fig. 3 by the effect of the reaction spring 23 which is lodged in the disk 4 and urges outwardly a socket 24 provided with a nib 25 engaged in a recess 26 in the end of the shaft 1. The said shaft draws with it a toothed ring 11 which is situated outwardly of the pinion 2 with respect to the engine, and the planetary gear holder is provided with the teeth 12. In order to further the action of the spring 23, the fields 27 of the starter are displaced with reference to the armature so as to exert upon the latter a magnetic traction in the direction of the arrow $g$.

On the side next the hand crank, the shaft 1 is free to move, and the ball-bearing is mounted directly upon the same. The ratchet ring 6 is secured to the disk 4, whilst the ring 7 is secured to the front bearing 29 of the starter.

The general arrangement of the change-speed box is the same as in the preceding case, but the operation is somewhat different, because the ring 7 which was secured to the bearing 8 is herein replaced by the clutching teeth 7 formed upon the front bearing 29, and the ring 6 is replaced by clutching teeth formed upon the planetary gear disk 4. To obtain the speed reduction, the ring 5 should be displaced in the direction of the arrow $h$ and in the direction of the arrow $g$, so as to obtain the direct drive, the latter being had by changing the inclination of the helical toothed part of all the pinions.

In the event of an accident to the electrical part of the starter, one removes the cover 19 shown in broken lines, and the crank 31 is engaged at the end 30 of the starter upon which it becomes centered, then the operator acts with the crank upon the shaft 1 according to the arrow $h$. This compresses the spring 23, the teeth 11 of said shaft will engage the corresponding teeth 12 of the planetary gear holder, and the engine can now be started.

In the modification shown in Fig. 4, the change-speed box is constituted in the following manner. The worm gear 2 is keyed to or formed integrally with the shaft 1 and is disposed at some distance from its end. The disk 32 mounted loose on the shaft 1 is provided with two sliding gear sets consisting of the worm gears 33 and the spur gears 34 which are connected together by the shafts 35. The gears 34 cooperate with a pinion 36 keyed to the shaft 37 of the engine and provided with the clutching teeth 38 adapted to engage corresponding teeth 39 on the disk 32. Said disk is provided wth a second set of like teeth 40 adapted to hold the said disk upon the front bearing 41 of the starter which is provided to this effect with the clutching teeth 42.

The shaft is supposed to rotate according to the arrow $e$, and due to the worm gears and to the inclination of the clutching teeth 39, the disk 32 will move in the direction of the arrow $m$, and the teeth 40 are caused to engage the teeth 42.

When the shaft 37 becomes the driving shaft, the said disk moves in the contrary direction to $m$; the teeth 39 engage with the teeth 38; the shaft 1 is actuated at the same speed as 37, and this provides for the direct drive.

It should be observed that by reason of the reactions of the worm gearing, when the shaft 1 acts as a driving shaft it tends to move in the direction contrary to $m$, so that the teeth 43 on its end cannot engage the teeth 44 on the shaft 37, whereby the hand crank can be used for starting when the shaft 1 is moved in the axial direction as above stated.

Fig. 5 shows a change-speed box wherein the planetary gear holder 32 which is keyed at 45 to the shaft 1 has mounted thereon the two planetary gear sets 33 and 34. As above mentioned, the first of these gears have helical teeth and engage the worm gear 2 mounted loose on the shaft 1, whilst the second gears engage the pinion 36 keyed to the shaft 37. The gear 2 is provided with the teeth 46, 47 respectively engaging the teeth 48, 49 formed upon the stationary bearing 50 and the disk 32.

When the starter is set in operation, the pinion 2 is stopped at 48, and it then makes direct connection with the disk 32 by means of the teeth 49 when the shaft 37 becomes a driving shaft. The clutching teeth 43 and 44 used for hand crank starting are provided respectively upon the disk 32 and the pinion 36.

It should be remarked that if instead of external teeth the pinions 2 and 36 were provided with internal teeth, the change-speed box would operate in quite the same manner.

Claims:

1. In a starting motor having a pinion mounted on its shaft, a planetary gear holder adapted to be coupled to the engine crankshaft, planetary gears gearing with said pinion, an internally toothed ring gearing with the planetary gears and adapted to slide axially, a stationary plate, the said ring having a circular row of inclined teeth upon each of its sides, the said planetary gear holder having a circular row of inclined teeth adapted to engage the said inclined teeth formed upon one of the sides of the said ring, and the said stationary plate having a circular row of inclined teeth adapted to engage the said inclined teeth formed upon the other side of the said ring.

2. In a starting motor having a pinion mounted on its shaft, a planetary gear holder adapted to be coupled to the engine crangshaft, planetary gears gearing with said pinion, an internally toothed ring gearing with the planetary gears and slidable axially and a stationary plate, means for coupling said ring alternatively to said planetary gear holder and to the said stationary plate, these means consisting in teeth formed upon both sides of the ring and upon the respective sides of the planetary gear holder and of the stationary plate, the said planetary gear holder having on its periphery a smooth cylindrical part and the internal teeth of the external ring being adapted to slide upon this smooth cylindrical part.

In testimony that I claim the foregoing as my invention I have signed my name.

LÉON LANQUETIN.